/ 23/85    OR    4,530,564

United States Patent [19]
Close

[11] Patent Number: 4,530,564
[45] Date of Patent: Jul. 23, 1985

[54] METHOD AND APPARATUS FOR PRODUCTION OF HOLOGRAPHIC OPTICAL ELEMENTS

[75] Inventor: Donald H. Close, Santa Monica, Calif.

[73] Assignee: Hughes Aircraft Company, El Segundo, Calif.

[21] Appl. No.: 179,336

[22] Filed: Aug. 18, 1980

[51] Int. Cl.³ .............................. G42B 5/32; G43H 1/22
[52] U.S. Cl. .................................. 350/3.69; 350/3.85; 350/3.72
[58] Field of Search ............. 350/3.72, 3.77, 3.7, 350/3.65, 3.69, 3.85; 430/1, 2

[56] References Cited
U.S. PATENT DOCUMENTS

| | | | |
|---|---|---|---|
| 3,639,031 | 2/1972 | Lin | 350/3.69 |
| 3,647,289 | 3/1972 | Weber | 350/3.69 |
| 3,758,186 | 9/1973 | Brumm | 350/3.69 |
| 3,940,204 | 2/1976 | Withrington | 350/3.72 |
| 4,312,559 | 1/1982 | Kojima et al. | 350/3.72 |

*Primary Examiner*—John K. Corbin
*Assistant Examiner*—William Propp
*Attorney, Agent, or Firm*—Gregory D. Ogrod; A. W. Karambelas

[57] ABSTRACT

System holographic optical element 22 has a substrate 24 and developed grating carrying layer 26 and is for use in an optical system. It is exposed from a coherent point source 50 with the aid of a fabrication holographic optical element 40 having a grating layer 44 so that the photosensitive emulsion (i.e., point 38) is exposed both directly from the point source 50 and by reflection from a point 56 in the grating in the fabrication holographic optical element.

13 Claims, 4 Drawing Figures

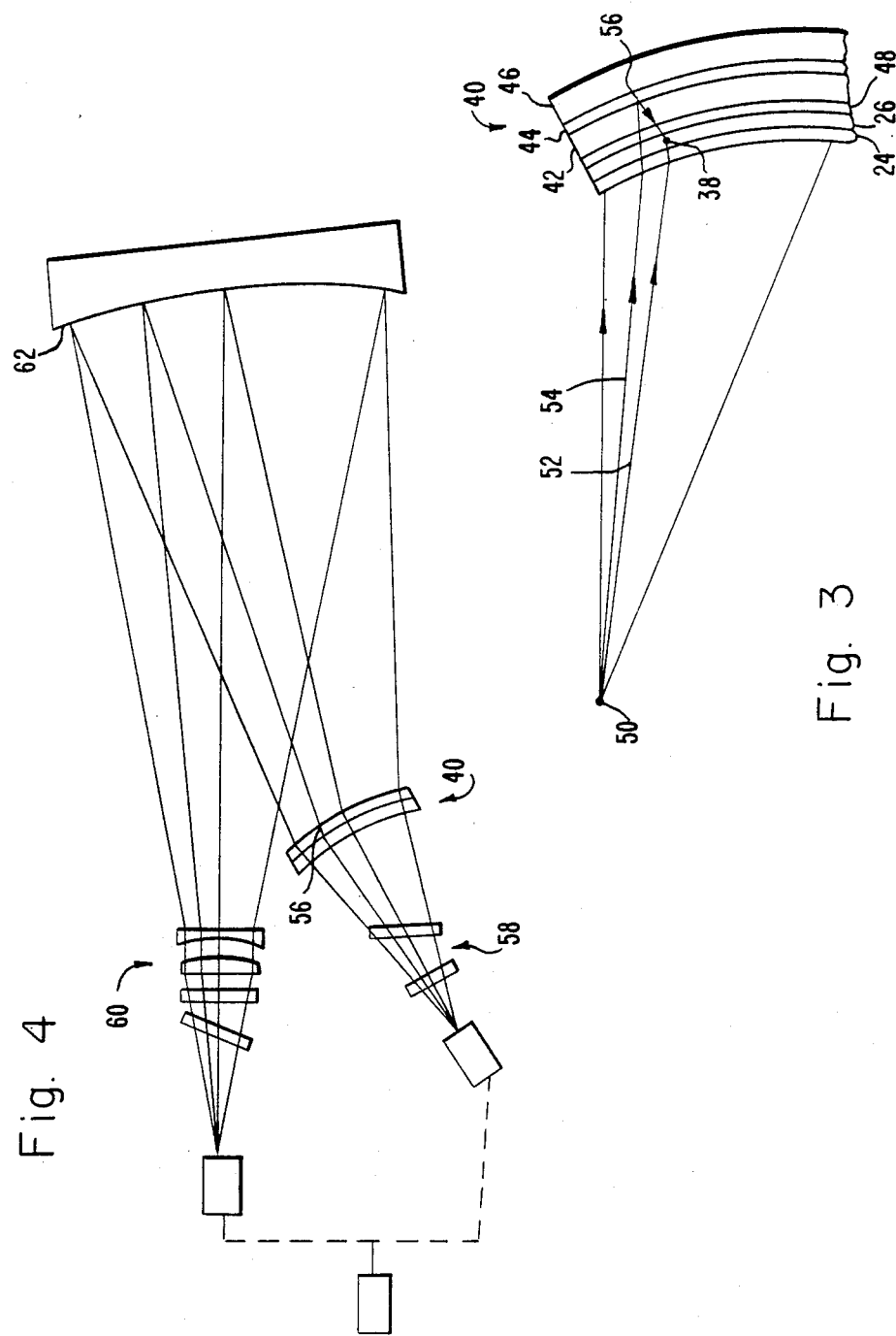

METHOD AND APPARATUS FOR PRODUCTION OF HOLOGRAPHIC OPTICAL ELEMENTS

BACKGROUND OF THE INVENTION

This invention is directed to the method and apparatus for the production of holographic optical elements. Holographic optical elements are finding a variety of uses, including helmet mounted displays such as disclosed in U.S. Pat. No. 3,928,108, and head-up displays such as disclosed in Withrington U.S. Pat. No. 3,940,204. Hologram optical elements are also useful in eye protection reflectors for laser radiation, and for novelty optical effects such as pendant jewelry.

In addition to the above patents the background also includes Withrington et al U.S. Pat. No. 4,218,111 as well as an article "Holographic Optical Elements" published by D. H. Close in the Sept–Oct 1975 issue of "Optical Engineering". All of the background references are incorporated herein in their entirety by this reference.

Such holographic optical elements have been produced by interfering patterns of coherent radiation to produce an image in a photosensitive substrate. Since the patterns are produced by interference of optical waves, the structure must be rigid during exposure because shifting causes destruction of the interference pattern. Since the wavelength is short, very great care must be taken to properly hold all of the elements in place. Thus, there is need for a method and apparatus by which holographic optical elements can be produced without that difficulty.

SUMMARY

In order to aid in the understanding of this invention, it can be stated in essentially summary form that it is directed to both a method and apparatus for production of holographic optical elements. It comprises first the production of a master holographic optical element from which the system holographic optical element is contact exposed. The master holographic optical element is a properly different configuration so that the system holographic optical element exposed therefrom is of the proper configuration for the system.

It is thus a purpose and advantage of this invention to provide a method and apparatus for the production of holographic optical elements such that system holographic optical elements can be produced quickly and economically with simpler optical equipment.

It is another purpose and advantage to provide a method which includes the exposure of a master holographic optical element, followed by the exposure of a system holographic optical element therefrom, all configured so that the system holographic optical element is of the proper configuration.

It is a further purpose and advantage to provide an apparatus wherein a master holographic optical element is exposed in a manner similar to the production of an optical element for use in the ultimate system, but with sufficiently different configuration to produce a slightly different master holographic optical element, and the apparatus further includes means for exposing a system holographic optical element from the master holographic optical element so that the system element is of the the proper configuration for the system.

Other purposes and advantages of this invention will become apparent from the study of the following portion of this specification, the claims and the attached drawings.

BRIEF DESCRIPTION OF THE DRAWINGS

FIG. 3 is a schematic side elevational view of the arrangement by which the system optical element is exposed in direct contact with a fabrication holographic optical element in accordance with this invention.

FIG. 4 is a schematic view of the optics used in the construction of the fabrication optical element. Although FIG. 4 is drawn to appear the same as FIG. 2, it should be clear that the beam angles, point source locations and construction beam optics are in fact different in the two cases.

DESCRIPTION OF THE PREFERRED EMBODIMENT

Figure 1:
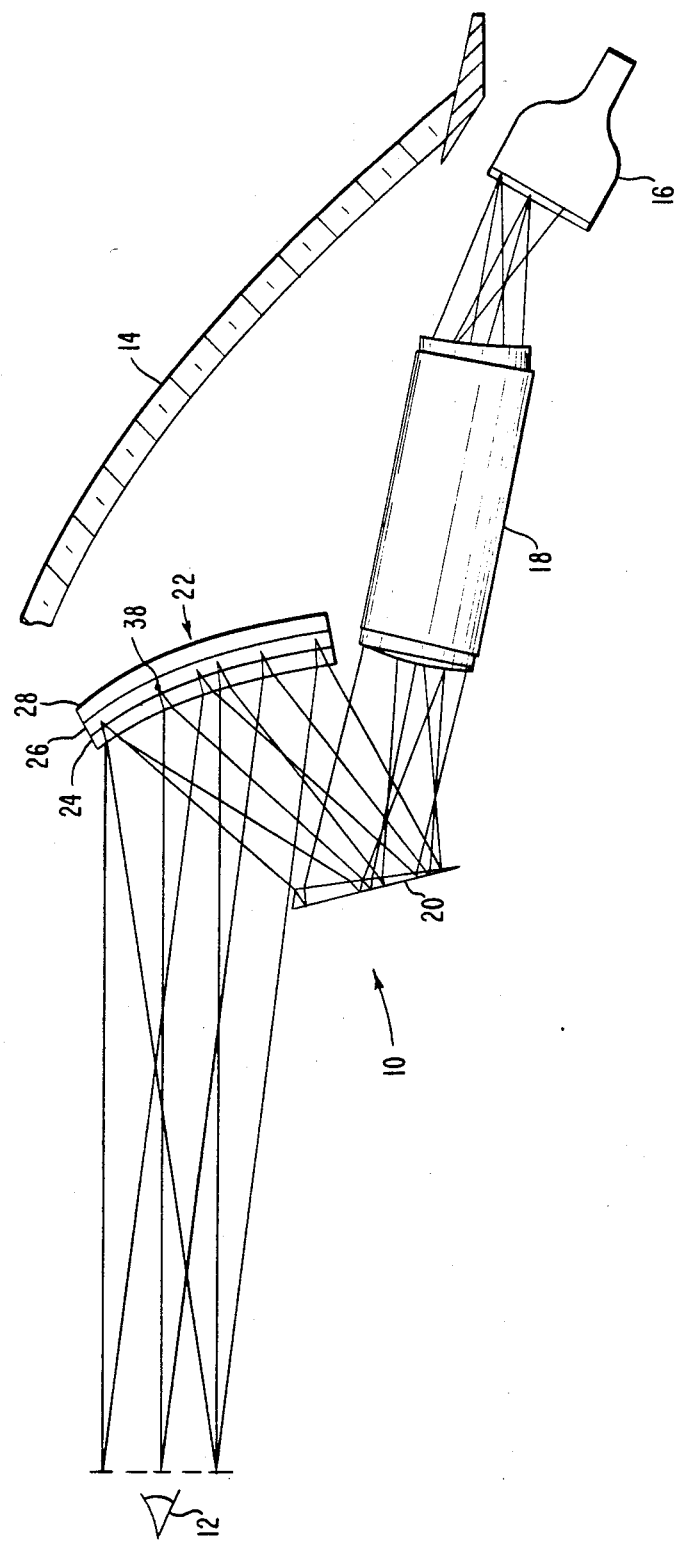
FIG. 1 is a schematic side elevational view of a head-up display employing a system holographic optical element produced by the method and apparatus of this invention.

The optical display system 10 illustrated in FIG. 1 is particularly of the type described in more detail in Withrington U.S. Pat. No. 3,940,204 and U.S. Pat. No. 4,218,111. FIG. 1 illustrates the eye 12 of an aircraft pilot observing the forward view out of the aircraft through canopy 14. In order to permit the pilot to observe additional data while looking out through canopy 14, the optical display system 10 is provided. It comprises a cathode ray tube 16 which is supplied electronic data from a suitable source, a complex relay lens 18 which is described in more detail in U.S. Pat. No. 4,218,111, a folding prism 20 and holographic optical element 22. It is the making of the holographic optical element which is the subject of this invention.

Holographic optical elements function by the diffraction of a light from a generalized grating structure with nonuniform groove spacing. Such elements include a system of film optics and are capable of unique system functions and configurations. In the present case, the holographic optical element functions as a combiner, because the aircraft pilot can see through it to observe the real-time scene in front of canopy 14, and at the same time observe the data presented by cathode ray tube 16, which is presented at holographic optical element 22 as if appearing to have an infinite focal length.

The holographic optical element 22 is formed with a substrate 24, an emulsion layer 26 and a cover plate 28. Substrate 24 can be of glass or can be of synthetic polymer composition material of hydrophobic nature, including such materials as cellulose acetate, polystyrene, polyester, poly(methyl methacrylate) and polycarbonate. The thickness of the substrate is not critical, other than it be thick enough to provide adequate support for the photosensitive layer 26 and thin enough to be substantially optically transmissive. Thickness typically ranges from about 1/10 to ¼ inch. For the purpose of the present invention, optically transparent means that the material is substantially transparent, at least over the visible and near-infrared regions. For all three of the layers in holographic optical element 22, basic transparency of the materials should be such that the transmitted radiation should be at least about 95% of the incident radiation.

Emulsion layer 26 is a photosensitive layer and is usually hydrophilic, hence polar. It may comprise emulsions which utilize hydrophilic organic colloids as an emulsion vehicle. Such colloids include dichromated gelatin, photographic silver halide emulsion, diazo gelatin and other gelatin based photosensitive materials. The thickness of the photosensitive layer ranges from about 1 to 100 microns as is well-known. Generally, the thicker the layer, the more efficient in defracting light. On the other hand, the thinner the layer the larger the viewable angle and the larger the spectral bandwidth. Photosensitive layers for conventional holograms are more preferably typically range from about 6 to 20 microns, as is well-known.

Figure 2:
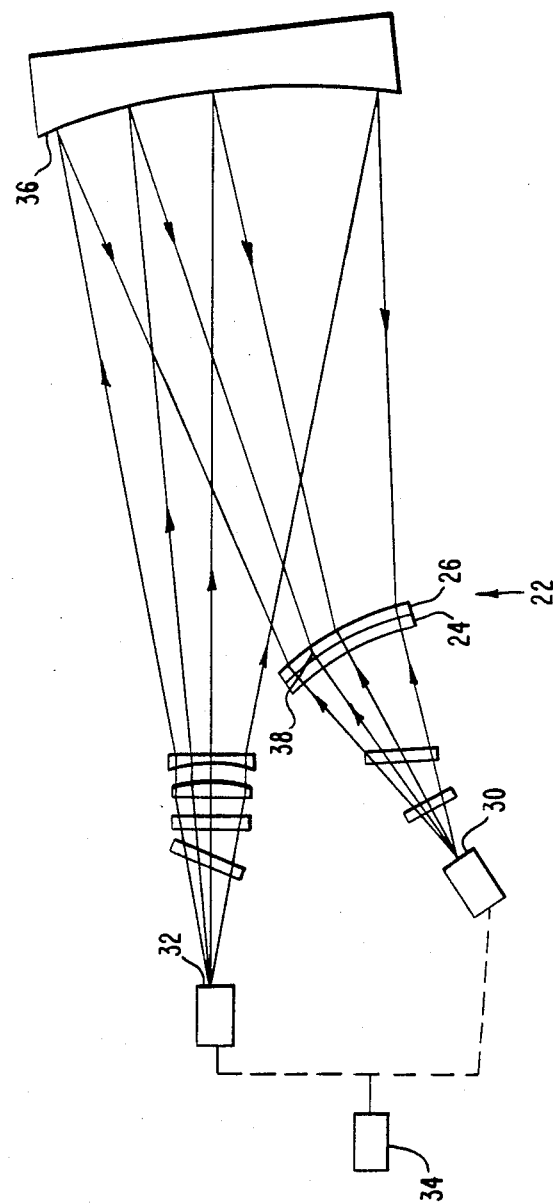
FIG. 2 is a schematic view of the optical system usually used for the production of the system holographic optical element used in the system of FIG. 1.

To expose the emulsion layer 26 to produce a latent image thereon, the construction optics of FIG. 2 can be used. The wave fronts used in construction of the holographic optical element 22 are obtained from two mutually coherent point sources 30 and 32, the object and reference beam point sources respectively. These sources may be derived from the same laser 34 by means of suitable optical means including beam splitting techniques, microscope objectives and spatial filters, joining the laser with the point sources. The object beam point source 30 is located close to the desired hologram exit pupil.

The reference beam point source 32 is imaged via the spherical mirror 36 at a point located close to the desired entrance pupil to the holographic optical element. The mirror 36 corresponds to the exit pupil of the relay lens 18 and is located close to the center of the relay lens in order to minimize the relay lens diameter. It should be noted that correction optics are employed along both image paths to provide corrections which produce a stigmatic image system.

The wave fronts through these separate optical paths converge in the emulsion layer 26 to produce a latent image of the desired grating. The photosensitive image layer 26 is then developed by methods known in the art to obtain the recorded image corresponding to the latent image. In the case of a photosensitive layer comprising dichromated gelatin, an aqueous solution, followed by dehydration with an alcohol is generally used to develop the image.

After development, the cover plate 28 (FIG. 1) is applied as a protective layer. Cover plate 28 may be of glass or may be one of the synthetic polymer composition materials mentioned above, preferably coated with a layer of moisture barrier, all of which is attached to the photosensitive layer to provide the holographic optical element 22 which is sufficiently rigid and sufficiently protected to provide the required grating. For reference purposes, a particular point 38 is located in the grating.

The construction beams in the construction optics of FIG. 2 require large aperture lenses and large aperture mirrors and are specially designed to provide appropriately aberrated construction wave fronts, one of which is a converging beam. Thus, the construction optics of FIG. 2 is a large structure and is extremely sensitive to vibration, dust and scratches on the construction beam optics. Furthermore, this apparatus is so expensive that it is impractical to replicate the construction optics. The expense is in the equipment, the facilities to house and protect the equipment, and the manpower required to operate the equipment. This impracticability of replication of the construction optics, along with the tendency toward low yield because of the complexity of the system, produces low output of holographic optical elements, such as element 22. There is need for a method and apparatus for the production of holographic optical elements which can more quickly and with lesser expenditure of skilled manpower and sensititve equipment produce a good yield of accurate holographic optical elements.

FIG. 3 illustrates the apparatus of this invention and the method by which it exposes the system holographic optical element 22. In FIG. 3, the substrate 24 and emulsion layer 26 of the system holographic optical element (initially in the unexposed condition) are positioned with a fabrication holographic optical element comprised of fabrication holographic optical element substrate 42, its exposed and developed emulsion layer 44 and its cover plate 46. The fabrication holographic optical element 40 is placed in conjunction with the substrate 24 and its unexposed emulsion layer 26, with an index matching fluid layer 48 therebetween. The assembly illustrated in FIG. 3 is exposed to a point source 50 of coherent radiation, which may be a laser which has a beam expander/spatial filter on its output to produce the exposure beam illustrated in FIG. 3. In order to produce the correct grating in emulsion layer 26, the first ray 52 from the point source appears at point 38. A second ray 54 from the point source passes through to emulsion layer 44 which has already been exposed and developed to point 56 in the fabrication holographic optical element 40 from whence it is reflected back to point 38 where the interfering wavefront produces the desired grating at point 38. The entire fabrication holographic optical element 40 has a suitable grating (which is different than the desired grating in system holographic optical element 22) to produce the desired grating in the system holographic optical element. After exposure to produce the latent image of the grating in the emulsion layer 26 of the system holographic optical element 22, the latent image is developed as described above and a cover plate applied to protect the system, also as described above. In this way, system holographic optical elements 22 can be produced with the relatively simple setup and optical system schematically illustrated in FIG. 3.

FIG. 4 illustrates the construction optics for producing the fabrication holographic optical element 40. It is similar to the system described with respect to FIG. 2, but the lens systems 58 and 60 and mirror 62 are suitably configured and placed to expose the fabrication holographic optical element 40, with its correctly positioned gratings, to serve in its fabrication function as described with respect to FIG. 3. The desired grating in the fabrication holographic optical element 40, can be computed from the geometrics of the single point exposure of the system holographic optical element as indicated in FIG. 3 and from this can be calculated the construction optics with a fabrication holographic optical element of FIG. 4 to produce the required grating in the fabrication holographic optical element.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A holographic optical element assembly comprising:

a fabrication reflection holographic optical element, said fabrication reflection holographic optical element comprising a developed first reflection grating means for forming a first image when illuminated from a first preselected focal point, said first reflection grating means being positioned between a substrate and a cover plate, said first reflection grating means being configured for producing a system combiner holographic optical element; and an undeveloped system combiner holographic optical element, said undeveloped system combiner holographic optical element having a substrate with a photosensitive layer thereon, said undeveloped system combiner holographic optical element lying adjacent and in front of said fabrication reflection holographic optical element, so that when exposed to a source of coherent radiation to which said photosensitive layer is sensitive from the side of said undeveloped system combiner holographic optical element away from said fabrication reflection holographic optical element, a latent image of second grating means is exposed in said undeveloped system combiner holographic optical element photosensitive layer, that latent image of a second grating means being such that when it is developed it is a combiner grating means for producing a second image different than the first image when illuminated from a second preselected focal point and is a desired image combiner grating.

2. The holographic optical element assembly of claim 1 wherein said photosensitive layer on said undeveloped system holographic optical element lies adjacent said substrate of said fabrication holographic optical element.

3. The holographic optical element assembly of claim 2 further including in combination a point source of divergent coherent radiation of wave length suitable to expose said photosensitive layer to form an apparatus for the production of system holographic optical elements having the required latent image therein.

4. The holographic optical element assembly of claim 1 further including in combination a point source of divergent coherent radiation of wave length suitable to expose said photosensitive layer to form an apparatus for the production of system holographic optical elements having the required latent image therein.

5. The holographic optical element assembly of claim 1 wherein:
said system combiner holographic optical element is physically curved in a predetermined shape as required by the optical system which employs said system combiner holographic element; and
said fabrication reflection holographic optical element is physically curved so as to be approximately parallel to the surface of said system combiner holographic element.

6. An apparatus for the production of combiner holographic optical elements comprising:
a point source of coherent radiation;
a fabrication reflection holographic optical element having first reflection grating means thereon for producing a first image when illuminated by said point source from a first predetermined focal distance, said fabrication reflection holographic optical element being positioned with respect to said point radiation source; and
a photosenstive layer on a substrate for production of a system combiner holographic optical element, said photosensitive layer being positioned against said fabrication reflection holographic optical element on the side thereof toward said point source with index matching fluid therebetween to substantially match the index of refraction therebetween and being positioned with respect to said radiation source so that when exposed to radiation directly from said source and from radiation from said source reflected from said fabrication reflection holographic optical element having the first reflection grating means thereon, a latent image of a combiner grating means is produced in said photosensitive layer, the latent image of said combiner grating means being such that when developed and placed in an optical display device and illuminated by a point source from a second focal distance the combiner grating means in the developed system combiner holographic optical element produces the correct optical effect in said optical display.

7. The apparatus in claim 6 wherein said source of radiation is a point source of divergent coherent radiation.

8. The apparatus of claim 6 wherein said fabrication reflection holographic optical element is comprising of an emulsion layer having said first reflection grating means therein, and said emulsion layer has a substrate on one side thereof and a cover plate on the other side thereof to protect said first reflection grating means in said fabrication reflection holographic optical element.

9. The apparatus of claim 6 wherein:
said system combiner holographic element is physically curved in a pattern predetermined by the operating requirements of the optical system employing said system combiner holographic element; and
said fabrication reflection holographic optical element is physically curved so that it is approximately parallel to the surface of said system combiner element.

10. The method of making a system combiner holographic optical element comprising the steps of:
exposing the latent image of a first grating in a photosensitive layer by coherent radiation from object and reference beam point sources with the object beam point source being positioned at a first predetermined distance from the first photosensitive layer;
developing the first photosensitive layer to provide a first reflection grating which is the grating in a fabrication reflection holographic optical element which serves as an intermediate element to the production of a desired combiner grating;
providing an undeveloped system combiner holographic optical element substrate with an unexposed photosensitive layer thereon;
positioning the fabrication reflection holographic optical element against the undeveloped system combiner holographical optical element substrate on the side thereof away from a second point radiation source;
exposing the photosensitive layer in the undeveloped system combiner holographic optical element substrate by coherent radiation both directly from the second point radiation source at a preselected distance from the undeveloped system combiner holographic optical element, and reflecting from the grating in the fabrication reflection holographic optical element from the second point radiation source, to form a grating latent image in the photosensitive layer of the undeveloped system combiner holographic optical element;

developing the latent image in the photosensitive layer of the undeveloped system combiner holographic optical element to produce a developed combiner grating which produces the desired optical result; and covering the developed combiner grating of the system holographic optical to form a complete system holographic optical element.

11. The method of claim 10 wherein the radiation step comprises exposing the photosensitive layer from a divergent point source of coherent radiation.

12. The method of claim 10 wherein the positioning step of positioning the photosensitive layer with respect to the fabrication holographic optical element includes placing the photosensitive layer directly adjacent the fabrication holographic optical element and positioning a layer of index matching fluid therebetween.

13. The method of claim 12 wherein the radiation step comprises exposing the photosensitive layer from a divergent point source of coherent radiation.

* * * * *